Aug. 5, 1924.　　　　　　　　　　　　　　　　1,503,847
J. A. PILCHER
SIX-WHEEL CAR TRUCK
Filed June 21, 1921　　2 Sheets-Sheet 1

INVENTOR
John A. Pilcher.

Aug. 5, 1924.

J. A. PILCHER 1,503,847

SIX-WHEEL CAR TRUCK

Filed June 21, 1921    2 Sheets-Sheet 2

INVENTOR
John A. Pilcher.

Patented Aug. 5, 1924.

1,503,847

UNITED STATES PATENT OFFICE.

JOHN A. PILCHER, OF ROANOKE, VIRGINIA.

SIX-WHEEL CAR TRUCK.

Application filed June 21, 1921. Serial No. 479,300.

*To all whom it may concern:*

Be it known that I, JOHN A. PILCHER, a citizen of the United States, residing in the city of Roanoke, and in the county of Roanoke, State of Virginia, respectively, have invented certain new and useful Improvements in Six-Wheel Car Trucks, of which the following is a specification.

This invention relates to six-wheel car trucks, the principal object being to generally improve upon and simplify the construction of the existing forms of trucks of the type to which the invention relates; to provide a construction which materially increases the flexibility of the truck, and to provide a form of truck with easy access for inspection and of minimum weight.

With the foregoing and other objects in view, the invention consists of the formation, combination and arrangement of the various elements, hereinafter more fully described and claimed, and illustrated in the accompanying drawings, in which:

Figure 1:
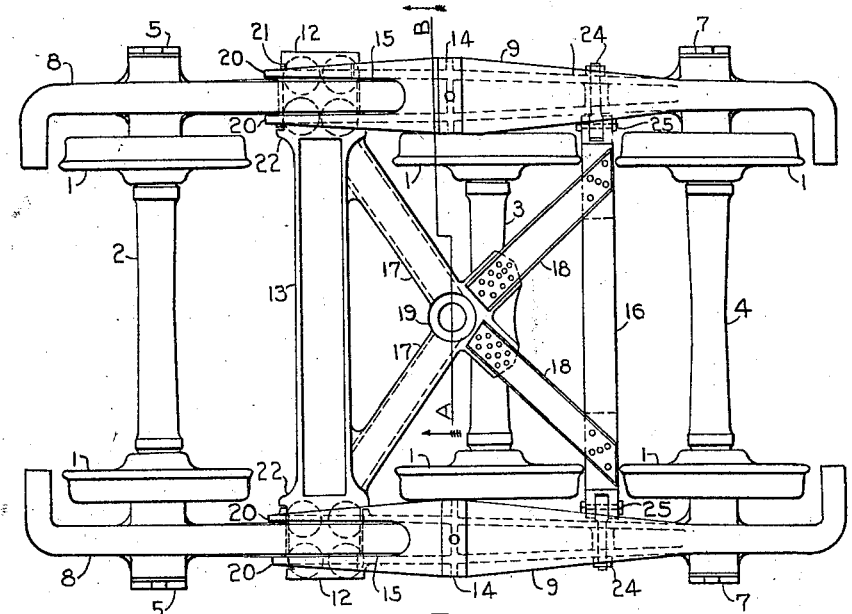
Figure 1 is a plan view of a truck embodying the features of the present invention.
Figure 2:
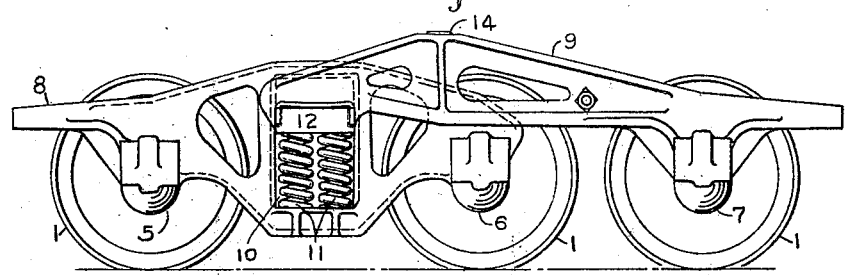
Figure 2 is a side elevational view of the improved car truck.
Figures 3, 4:
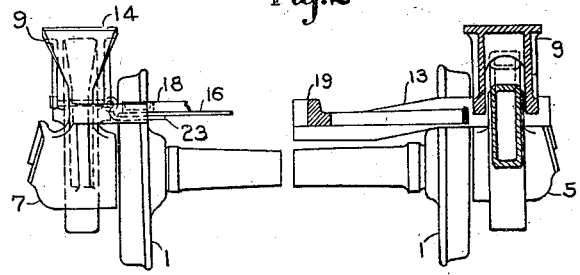
Figure 3 is a half end elevational view of the truck.
Figure 4 is a half transverse vertical section taken approximately on line A—B of Figure 1.
Figure 5:
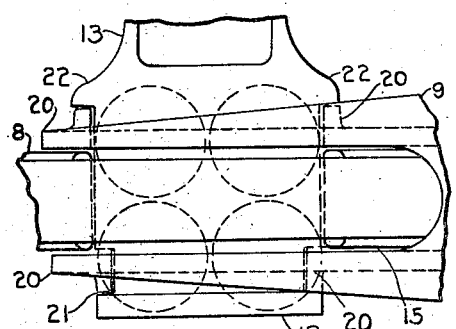
Figure 5 is an enlarged view of a portion of the truck shown in Figure 1.
Figure 6:
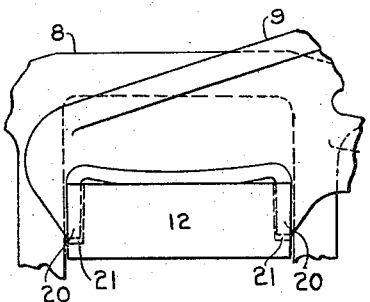
Figure 6 is a side elevational view of the part shown in Figure 5.
Figure 7:
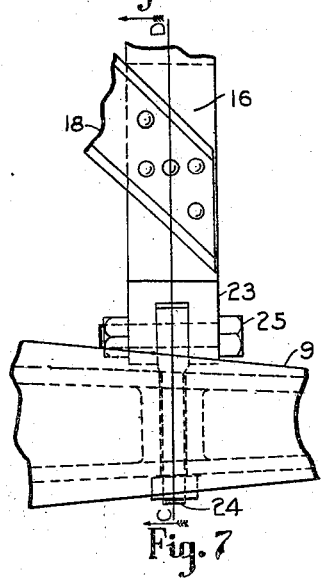
Figure 7 is an enlarged view of another portion of the truck shown in Figure 1.
Figure 8:
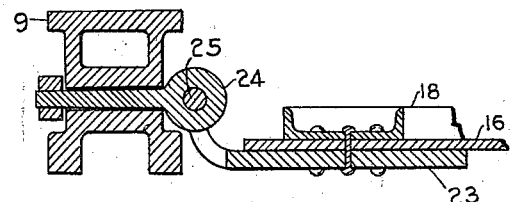
Figure 8 is a section taken on the line C—D of Figure 7.

Referring by numerals to the accompanying drawings, which illustrate a practical embodiment of my invention, 1—1, (etc.), represent the wheels secured in the customary way to the axles 2, 3 and 4, respectively. The ends of the axles 2, 3 and 4 are journaled in the oil boxes 5, 6 and 7, respectively, which may be of any approved form. I consider it preferable, however, that the boxes 5 and 6 be cast integral with the side frame sections 8, and the boxes 7 be cast integral with the load-receiving equalizing members 9.

Disposed at the sides of the truck without the lines of the truck wheels and supported by the axles 2 and 3, are the side-frame sections 8. Each of the side-frame sections has the customary window openings 10, with the load-carrying springs 11 positioned therein and supported by the said side-frame sections. The springs 11 are so located longitudinally along the side-frame sections that any load applied thereto will be divided as desired between the axles 2 and 3. Positioned within the window openings 10 of the side-frame sections, and guided by the sides of the said openings, are the spring caps 12, supported by the springs 11. The spring caps 12 may be formed integral with the direct cross member 13, or secured thereto.

At either side of the truck, disposed without the lines of the truck wheels, are the load-receiving equalizing members 9, with their load-receiving seats 14, so located longitudinally that any desired portion of the superimposed load will be transmitted to the side-frame sections 8 and the remaining portion direct to the axle 4. Each of the load-receiving equalizing members 9 is preferably cast in a single piece with one end bifurcated at 15 to receive the side-frame sections 8, and the other end cast integral with, or resting on the oil boxes 7.

For holding the side-frame sections 8 and the load-receiving equalizing members in constant relationship, both laterally and longitudinally, there is provided a built-up brace member, consisting of the direct cross members 13 and 16, and the X-members 17 and 18. The direct cross member 13, together with the X-members 17, are preferably cast integral with the pivoting member 19. The direct cross member 16 and the X-members 18 are preferably of rolled sections.

The bifurcated ends of the load-receiving equalizing members 9 are provided with extensions 20, which, on the outer side of the side-frame sections 8, are positioned within the recesses 21 of the spring caps 12. On the inner side of the side-frame sections 8, the extensions 20 are positioned between the said side-frame sections 8 and the lugs 22 of the said spring caps 12. Thus when the load-receiving equalizing members 9 have been placed in position the side-frame sections 8 are operatively connected to the spring caps 12 by the extensions 20. Likewise, by means of the extensions 20 and the spring caps 12, the load-receiving equalizing members 9 are operatively connected to the side-frame sections 8. As the spring caps 12 are cast integral with or secured to the direct cross member 13, the side-frame sections 8 and one end of the load-receiving equalizing members 9 are held in constant lateral relationship.

For positioning the other ends of the said load-receiving equalizing members laterally, there is provided the second direct cross member 16, which is operatively connected to the load-receiving equalizing members by means of the hinges 23 and the eye-bolts 24. The eye-bolts 24 are secured to the hinges 23 by means of the bolts 25. The opening in the load-receiving equalizing member, which receives the eye-bolt 24, is larger in diameter than the said eye-bolt, in order that the load-receiving equalizing members may rotate about the said eye-bolt.

The X-members are secured at one end to the pivoting member 19 and at the other end to the direct cross member 16 and the hinge members 23.

Thus the side-frame sections 8 and the load-receiving equalizing members 9 are held in constant relationship horizontally in every direction by the built-up brace member. As the load-receiving equalizing members are rotatable about the eye-bolts 24 and the ends of the direct cross member 16, to which the eye-bolts 24 are operatively connected, are yieldable in a vertical plane, perfect equalization of the superimposed load will be maintained even when irregularities occur in the track.

The side-frame sections 8 and the load-receiving equalizing members 9 may be quickly and easily removed from the truck by first rotating the load-receiving equalizing member about the eye-bolt 24 until the extensions 20 on the said load-receiving equalizing member disengage the spring caps 12, and then removing the bolt 25, which operatively connects the eye-bolt 24 to the hinge member 23.

I have thus provided a six-wheel car truck that may be quickly and easily assembled and disassembled; one in which there is perfect equalization of superimposed car-body loads; one of minimum weight and with easy access for inspection.

It will be readily understood that minor changes in the size, form and construction of the various parts of my improved six-wheel car truck may be made and substituted for those herein shown and described without departing from the spirit of my invention, the scope of which is set forth in the appended claims.

I claim:

1. In a six-wheel car truck, a pair of side-frame sections disposed without the lines of the truck wheels, a pair of load-receiving equalizing members disposed without the lines of the truck wheels, the said load-receiving equalizing members being rotatable in a vertical plane about a point between the ends thereof.

2. In a six-wheel car truck, a pair of side-frame sections disposed without the lines of the truck wheels, a pair of load-receiving equalizing members disposed without the lines of the truck wheels, the said load-receiving equalizing members being rotatable in a vertical plane about a point yieldable in a vertical plane.

3. In a six-wheel car truck, a pair of side-frame sections disposed without the lines of the truck wheels and supported by two adjacent axles, a pair of load-receiving equalizing members disposed without the lines of the truck wheels, one end of said load-receiving equalizing members being supported by said side-frame sections and the other end by the third axle, the said load-receiving equalizing members being rotatable in a vertical plane about a point yieldable in a vertical plane.

4. In a six-wheel car truck, a pair of side-frame sections disposed without the lines of the truck wheels and supported by two adjacent axles, a pair of load-receiving equalizing members disposed without the lines of the truck wheels, one end of said load-receiving equalizing members being supported by the said side-frame sections and the other end by the third axle, a direct cross member operatively connecting one end of said load-receiving equalizing members, a second direct cross member operatively connected to the said load-receiving equalizing members at a point between the extremities thereof, the connection between the said second direct cross member and the said load-receiving equalizing members being such that the ends of the said load-receiving equalizing members are rotatable in a vertical plane.

5. In a six-wheel car truck, a pair of side-frame sections disposed without the lines of the truck wheels and supported by two adjacent axles, a pair of load-receiving equalizing members disposed without the lines of the truck wheels to which all of the superimposed car body loads are transmitted, one end of said load-receiving equalizing members being formed to receive the said side-frame sections and the other end being formed integral with the oil boxes of the third axle.

6. In a six-wheel car truck, the combination with a pair of side-frames disposed without the lines of the truck wheels and formed integral with the oil boxes of two adjacent axles, of a pair of load-receiving equalizing members disposed without the lines of the truck wheels to which all of the superimposed car body loads are transmitted, one end of said load-receiving equalizing members being supported by said side frames and the other end being formed integral with the oil boxes of the third axle, the said load-receiving equalizing members having load-receiving seats thereon so located longitudinally that a portion of the superimposed load will be transferred to the said side frames and the remainder to the third axle.

7. In a six-wheel car truck, the combination with a pair of side frames, of a pair of load-receiving equalizing members, the said frames having window openings with springs and spring caps positioned therein, the said spring caps being operatively connected to the said side frames by the said load-receiving equalizing members.

In testimony whereof I affix my signature.

JOHN A. PILCHER.